(No Model.)
M. WARD.
Seed Planter.
No. 231,514. Patented Aug. 24, 1880.
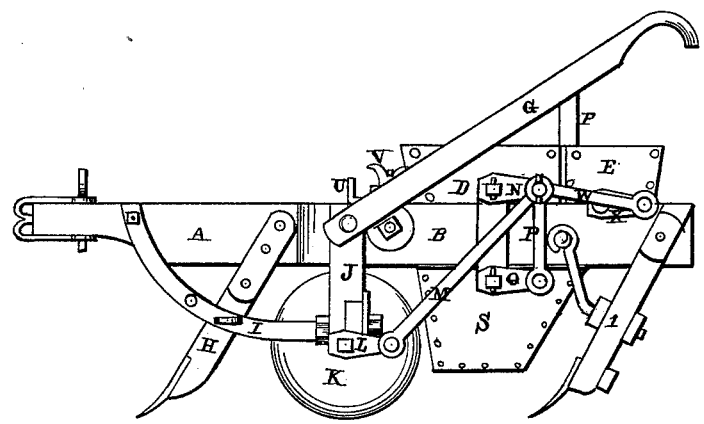
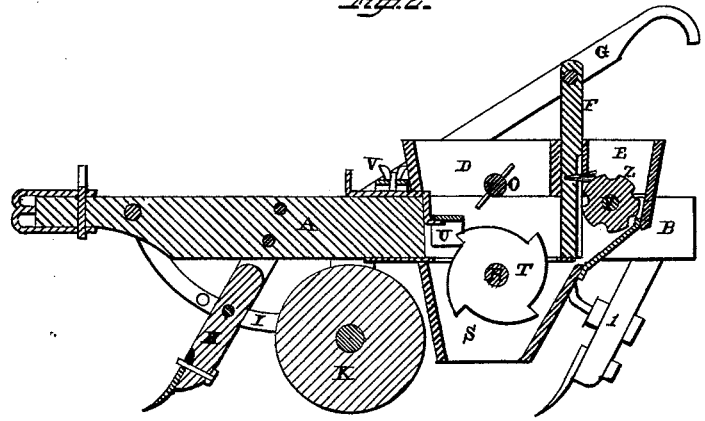

UNITED STATES PATENT OFFICE.

MICHAEL WARD, OF ASHLAND, TEXAS, ASSIGNOR OF TWO-THIRDS OF HIS RIGHT TO WM. J. MULLINS AND JOHN S. SHADDEN, OF SAME PLACE, ONE-THIRD TO EACH.

SEED-PLANTER.

SPECIFICATION forming part of Letters Patent No. 231,514, dated August 24, 1880.

Application filed June 29, 1880. (No model.)

*To all whom it may concern:*

Be it known that I, MICHAEL WARD, of Ashland, in the county of Hunt and State of Texas, have invented certain new and useful Improvements in Seed-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in seed-planters; and it consists in the arrangement and combination of devices which will be more fully described hereinafter, whereby corn or cotton-seed can be planted.

Figure 1 is a side elevation of my invention. Fig. 2 is a vertical longitudinal section of the same.

A represents the beam, which has secured to each side of its rear end an additional beam, B, and placed upon these two beams B, which are slightly separated from each other, is the cotton-seed box D, and the corn-box E just behind it. In between these two boxes rises a vertical standard, F, which forms a support for the two handles G. Pivoted to the under side of the front end of the planter is the swinging furrow-opener H, which can be either lowered so that its shovel will make the furrow for the seed to drop in, or it can be raised upward in the guides I by moving its holding-pin so that its shovel will not come in contact with the earth.

Journaled in the two vertical hangers J, which project downward from the front ends of the beams B, is the driving-wheel K, which has a crank, L, placed upon each end of its shaft or journal. These two hangers are secured rigidly in position by means of the two curved guides, between which the furrow-opener is held.

The two cranks on the ends of the shaft of the driving-wheel are placed at right angles to each other, so that while one is upon its dead-center the other will be receiving its greatest power. Fastened to each one of these cranks is a connecting-rod, M, which extends downward, and has its rear and upper end fastened to a crank, N, upon the shaft O. This shaft O passes through the cotton-seed box, and has a number of stirring-irons fastened to it for the purpose of keeping the cotton-seed constantly loosened. From this crank N there extends downward a second connecting-rod, P, to the crank Q, which is placed upon the end of the shaft R. This shaft extends through the upper part of the seed-tube S, and has secured to it a toothed wheel, T, which drops the cotton-seed. This wheel works through a slot made in the bottom of the cotton-seed box, and by catching hold of a seed with each tooth it forces the seed downward through the seed-tube S into the furrow, which has been made by the driving-wheel alone, or by the furrow-opener and driving-wheel together.

In order to regulate the number of seeds which shall be dropped at a time, a movable guard, U, is used. This guard U has its upper end bent at right angles, so as to have it project through the front end of the cotton-seed box, where it can be rigidly clamped in any desired position by means of the set-screw V. The lower end of this guard is made U-shaped where it straddles over the top of the toothed wheel, for the purpose of regulating the number of seeds that shall be dropped at a time. By adjusting this guard back and forth over the top of the wheel, either a single seed may be dropped at a time or any desired number.

Fastened to the outer end of the crank N is a connecting-rod, W, which extends horizontally backward, and has its rear end attached to the crank X on the end of the shaft Y, which extends through the bottom of the corn-box. Placed upon the shaft Y is the recessed dropping-cylinder Z, which is provided with the usual brush, for the purpose of brushing away the extra grains of corn.

Upon each one of the shafts, both upon the driving-wheel and in the two seed-boxes, there are placed two cranks, and both of the two cranks on each shaft are placed at right angles to each other, and are connected together by connecting-rods, as before described, so that there is a full set of cranks and connecting-rods on each side of the seed-planter. While one of these sets of cranks is upon its dead-center the other set is receiving its full impulse from the driving-wheel. By this arrangement of parts an even, steady, and continuous motion is given to the shafts through the whole of the time the planter is being moved along the ground.

Secured to the rear ends of the two beams B are the two covering-standards 1, which are secured rigidly in position, as shown. As the planter is drawn along after the seed has been dropped these two coverers cover the grain over in the usual manner.

When cotton-seed is being planted, if it is desired to throw the corn-cylinder out of gear, it is only necessary to uncouple the rear ends of the connecting-rods which operate it.

When it is desired to plant corn alone the cotton-seed box will be left empty, so that there is nothing left to plant from that box.

The object of this invention is to entirely do away with the use of belts in the operation of the two dropping-cylinders, so that there will be no slipping of the belts upon the pulleys, and thus cause the seed to be planted at different distances apart.

Having thus described my invention, I claim—

1. In a corn and cotton planter, the combination of a driving-wheel, K, a stirring device, O, dropping-wheel T, and cylinder Z, each one of the parts being provided with a crank upon each end, and all of them connected together by connecting-rods, so as to move together, substantially as shown.

2. The seed-guard having its lower end made U-shaped, so as to straddle over the top of the toothed dropping-wheel, and having its upper end bent at right angles, so as to project through the front end of the cotton-seed box, where it is held in position by means of a set-screw, substantially as set forth.

In testimony that I claim the foregoing I have hereunto set my hand this 16th day of June, 1880.

MICHAEL WARD.

Witnesses:
S. M. CASTEEL,
C. C. WELCH.